(12) United States Patent
Hudson et al.

US011078115B2

(10) Patent No.: US 11,078,115 B2
(45) Date of Patent: Aug. 3, 2021

(54) SEALANTS FOR INSULATING GLASS UNITS

(71) Applicant: TREMCO ILLBRUCK LIMITED, Manchester (GB)

(72) Inventors: John Michael Hudson, High Wycombe (GB); Rodney Ralph Brooks, Newcastle upon Tyne (GB); Isabelle Anne Marie Sagnat, Saint Apollinaire (FR); David Alan Pears, Deeside (GB); Magdalena Agnieszka Warunek, Deeside (GB)

(73) Assignee: TREMCO ILLBRUCK LIMITED, Greater Manchester (GB)

( * ) Notice: Subject to any disclaimer, the term of this patent is extended or adjusted under 35 U.S.C. 154(b) by 218 days.

(21) Appl. No.: 16/465,962

(22) PCT Filed: Dec. 8, 2017

(86) PCT No.: PCT/GB2017/053698
§ 371 (c)(1),
(2) Date: May 31, 2019

(87) PCT Pub. No.: WO2018/104750
PCT Pub. Date: Jun. 14, 2018

(65) Prior Publication Data
US 2020/0062644 A1 Feb. 27, 2020

(30) Foreign Application Priority Data
Dec. 9, 2016 (GB) .................. 1620952

(51) Int. Cl.
*C08L 23/08* (2006.01)
*C09J 123/22* (2006.01)
*C03C 27/10* (2006.01)
*C09J 123/04* (2006.01)
*C09J 123/10* (2006.01)
*C09J 133/06* (2006.01)
*C09J 133/12* (2006.01)
*E06B 3/673* (2006.01)

(52) U.S. Cl.
CPC ............ *C03C 27/10* (2013.01); *C09J 123/04* (2013.01); *C09J 123/10* (2013.01); *C09J 123/22* (2013.01); *C09J 133/064* (2013.01); *C09J 133/12* (2013.01); *E06B 3/67317* (2013.01); *E06B 3/67321* (2013.01)

(58) Field of Classification Search
CPC .. C08L 23/0869; C08L 23/0846; C08L 23/20; C08L 23/22; C09J 133/064; C09J 123/0869; C09J 123/0892; C09J 123/0846; C09J 123/20; C09J 123/22
See application file for complete search history.

(56) References Cited

U.S. PATENT DOCUMENTS

| 6,653,428 | B1 | 11/2003 | Klein et al. | |
|---|---|---|---|---|
| 2007/0062573 | A1 | 3/2007 | Ferri et al. | |
| 2010/0233100 | A1* | 9/2010 | Castle | C08L 51/003 424/48 |
| 2012/0264852 | A1* | 10/2012 | James | A61L 27/18 524/10 |
| 2014/0058045 | A1* | 2/2014 | Hermel-Davidock | C08F 8/34 525/327.4 |
| 2016/0130533 | A1 | 5/2016 | Castle et al. | |

OTHER PUBLICATIONS

International Search Report for PCT/GB2017/053698 (PCT/ISA/210) dated Apr. 4, 2018.
Written Opinion of the International Searching Authority for PCT/GB2017/053698 (PCT/ISA/237) dated Apr. 4, 2018.

* cited by examiner

Primary Examiner — Irina S Zemel
Assistant Examiner — Jeffrey S Lenihan
(74) Attorney, Agent, or Firm — Birch, Stewart, Kolasch & Birch, LLP

(57) ABSTRACT

Sealants for insulated glass units or solar panels are disclosed. The sealant comprises polyisobutylene and a polymer which is a copolymer obtained from the polymerisation of at least one ethylenically-unsaturated aliphatic hydrocarbon monomer and at least one monomer containing a maleic anhydride moiety. The copolymer comprises at least one amphiphilic polymer side chain. Processes for producing the sealants for insulated glass units or solar panels are also disclosed. Insulted glass units and solar panels comprising the sealant are also disclosed. Processes for producing the insulated glass units and solar panels comprising the sealant are also disclosed.

32 Claims, 3 Drawing Sheets

SEALANTS FOR INSULATING GLASS UNITS

BACKGROUND OF THE INVENTION

This invention relates generally to compositions which may be employed as insulated glass sealants and methods of manufacturing and utilizing such sealants in the construction of insulated glass units (IGUs).

Methods for sealing insulated glass panels, such as glass windows, with these rugged sealants, and the resulting articles, are also disclosed herein.

Insulated glass units (IGUs) generally comprise a pair of glass sheets, maintained in a spaced apart relationship to each other by a spacer assembly, and a sealing assembly which extends around the periphery of the inner facing surfaces of the glass sheets to define a sealed and insulating air space (optionally containing an inert gas such as argon) between the glass sheets Typically, the spacer assembly is a hollow form which extends around the periphery of the inside facing surfaces of the glass sheets and which is filled with a water-absorbent material, such as a molecular sieve or another dehydration element, to keep the enclosed air space dry. The inner surfaces of the glass sheets are attached to the outer surface of the spacer assembly by means of a sealant or adhesive. Generally, a sealant or adhesive is also used to seal the edges of the insulated glass unit so as to establish a barrier which prevents moisture from penetrating into the interior airspace of the unit.

The sealant must have a combination of properties for satisfactory use. For example, the sealant must have a very low moisture vapor transmission (MVT) rate so that moisture is prevented from entering the dry airspace between the panes of glass. Moisture in such space tends to condense on the interior faces of the panes, creating visibility and aesthetic problems, and cause degradation of the thermal insulation performance of the IGU. If the sealant does not have a satisfactory MVT rate, the longevity of the insulated unit may be severely reduced. The sealant should have good elongation and flexibility so that it "yields" during contraction and expansion of the insulated glass structure, for example, to relieve stress on the glass caused by changes in temperature. The sealant desirably also forms an excellent bond with the glass which is not degraded over long periods of use when exposed to sunlight, moisture, and large temperature changes. Tensile adhesion strength is an important indicator of bond strength.

Thermoplastic polyisobutylene is one common primary sealant. However this material lacks mechanical strength and it exhibits comparably less adhesion than the outermost or secondary sealant. As such, one function of the secondary sealant is to provide mechanical strength to the unit and to prevent rupture of the primary sealant during the natural thermal cycles to which the unit is exposed.

A dual-seal insulated glass unit (shown in FIG. 1) with hollow spacer is the traditional and still most popular construction: two panes of glass are held apart by a hollow metal, plastic or composite spacer bar frame Prior to application to the glass, the spacer frame has a primary sealant extruded onto its side walls After the assembly of the spacer frame and the two glass panes, a secondary sealant is applied to the outside of the IGU.

The primary sealant is based on polyisobutylene (PIB) polymers. It is a non-curing thermoplastic sealant. Its role is to keep atmospheric moisture out of the unit during its lifetime, and to keep inert thermally-insulating gases such as Argon inside the unit during its lifetime. It must remain flexible so that a seal is maintained when the IGU expands and contracts due to normal fluctuations in temperature, or due to wind-loads in a structural glazing application.

Examples of commercially-available primary sealants include JS680, JS780 and JS880 from tremco illbruck, GD115 from Kömmerling, SikaGlaze IG-5 from Sika and many others.

In their simplest form, PIB primary sealants are blends of polyisobutylene polymers and powdered carbon black. Suitable polyisobutylene polymers include the Oppanol B series from BASF Suitable carbon black types include Conductex SC or Elftex 575 from Birla Carbon and Monarch 430 from Cabot. Other ingredients such as mineral Fillers (e.g. talc or calcium carbonate) and plasticizers (egg polybutene) may also be incorporated.

Primary sealants are typically applied to a spacer frame, comprising the desiccant-filled hollow spacer bar which has been made into a rectangular frame by bending and joining a single length, or by joining four discrete lengths with plastic corner keys.

Primary sealant is then applied to this frame using an extrusion process. Typically The PIB sealant is applied to the spacer bar using a simple ram-fed extruder and a pair of dies, one die coating each side of the spacer bar.

The secondary sealant is strong, and has adhesive properties. Its job is to hold the unit together, and to allow sufficient movement to avoid glass breakage whilst minimizing as far as possible the amount of movement of the primary sealant. The secondary sealant is typically based on cross-linked polyurethane, polysulfide or silicone elastomers. It may also be based on hybrid polymers or it may be a thermoplastic hot-melt sealant based on butyl rubbers Other constructions are also used, and it is envisaged that the improved primary sealants of the invention could be used in any of these types.

A typical IGU mounted in a wood, metal or plastic frame will never see temperatures higher than 40 or 50° C. The accelerated test methodology of the European norm EN1279, for example, has a maximum temperature of 58° C. during the heat-soak part of the test.

However, in some circumstances IGUs can be exposed to significantly higher temperatures, even as high as 80° C. These circumstances include:

Triple glazing (shown in FIG. 2) heat captured by internal reflection can significantly increase the temperature seen by the centre lite in a triple-glazed IGU.

Structural glazing: where IGUs are mounted directly to the building facade using adhesives. There is no frame to shelter the edge seals from the sun, and high temperatures are possible in some countries.

Solar panels: a solar panel is similar in concept to an IGU except that one pane of glass is replaced by a photovoltaic assembly. They are mounted externally, and the edge seals may again have direct solar exposure.

In these cases the PIB primary sealant may become excessively heated and softened. This leads to an undesirable phenomenon known as butyl bleed, where the soft PIB sealant starts to creep into the airspace of the IGU under the mechanical forces of expansion and contraction. At best this is unsightly; at worst it can lead to premature failure of the IGU or solar panel.

Therefore it would be useful and commercially attractive to provide primary sealants with improved temperature resistance, whilst maintaining flexibility over the whole range of operating temperatures and having acceptable extrusion rates at the normal application temperature Benefits would include the elimination of butyl bleed, and more robust performance in key European standard test regimes such as EN1279-2 and EN1279-3.

SUMMARY OF THE INVENTION

We have surprisingly found that certain graft copolymers can improve the thermal resistance of PIB primary sealants, as measured using Theological testing over a range of temperatures.

What makes the current innovation so surprising is that this specific increase in stiffness occurs in the desired specific temperature range of 60-80° C. and the material flow characteristics of the sealant at either ambient temperature (25° C.) or at the extrusion temperature (120° C. to 140° C.) does not significantly change.

In a first aspect of the invention, there is provided a sealant for insulating glass units (IGUs) or solar panels, comprising polyisobutylene and a polymer having the formula (I):

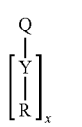

wherein:

Q represents a straight or branched chain polymer backbone which is a copolymer obtained from the polymerisation of at least one ethylenically-unsaturated aliphatic hydrocarbon monomer and at least one monomer containing a maleic anhydride moiety;

Y is selected from —O— or —NR$^1$—, wherein R$^1$ is H or C$_{1-4}$ alkyl;

R is an amphiphilic polymer side chain; and x is 1 to 5000.

In a second aspect of the invention, there is provided an integrated glass unit (IGU) containing a sealant according to the first aspect of the invention.

In a third aspect of the invention, there is provided a solar panel containing a sealant according to the first aspect of the invention.

In a third aspect of the invention, there is provided the use of a polymer according to the first aspect of the invention, in a sealant.

In a fourth aspect of the invention, there is provided a process for producing an IGU, comprising applying a sealant according to the first aspect of the invention as a primary sealant.

In a fifth aspect of the invention there is provided a process for producing a solar panel, comprising applying a sealant according to the first aspect of the invention as a sealant.

In a sixth aspect of the invention, there is provided a process for producing a sealant according to the first aspect of the invention, comprising mixing a polymer as defined in the first aspect of the invention with a polyisobutylene polymer.

By "amphiphilic" we mean that the polymeric material has hydrophilic and hydrophobic moieties. The term "hydrophilic", as used herein, refers to substances that have strongly polar groups that readily interact with water. The term "hydrophobic", as used herein, refers to substances that lack an affinity for water; tending to repel and not absorb water as well as not dissolve in or mix with water.

The side chains and polymer backbone may be ionic or non-ionic.

BRIEF DESCRIPTION OF THE DRAWINGS

FIG. 3 shows the creep test carried out at 60° C. on sample 9812/14 (the invention) compared to standard JS880.

FIG. 4 shows the creep test carried out at 80° C. on sample 9812/14 (the invention) compared to standard JS880.

DETAILED DESCRIPTION OF THE INVENTION

Figure 1:
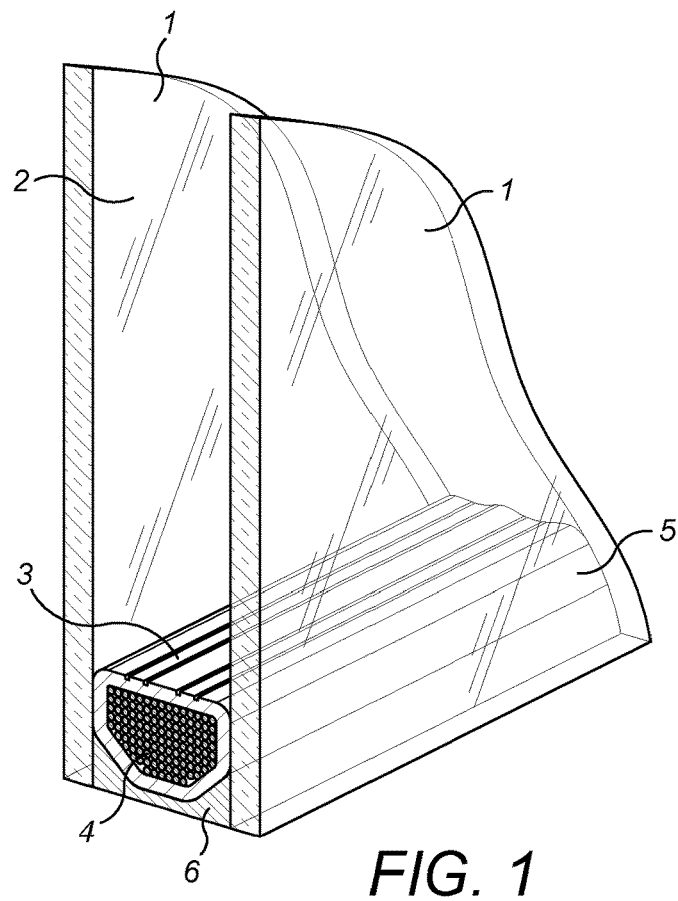
FIG. 1: double-glazed insulating glass unit with dual-seal construction and hollow metal spacer bar. 1 Glass panes, 2 glazing cavity filled with dry air or gas, 3 hollow aluminium spacer bar, 4 desiccant, 5 primary sealant, 6 secondary sealant
Figure 2:
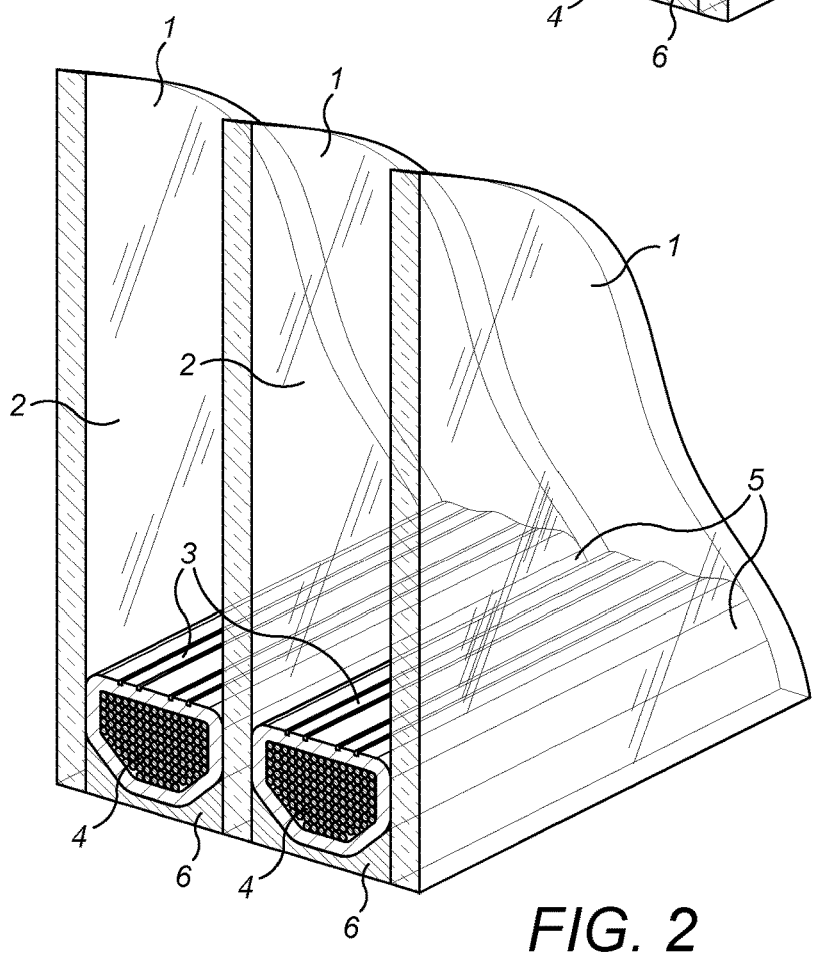
FIG. 2: triple-glazed insulating glass unit with dual-seal construction and hollow metal spacer bars. 1 Glass panes, 2 glazing cavity filled with dry air or gas, 3 hollow aluminium spacer bar, 4 desiccant, 5 primary sealant, 6 secondary sealant

The Polymers Used in the Sealant Composition of the Present Invention

The polymers of formula (I) used in the sealant composition of the present invention function as rheology modifiers when incorporated into PIB sealant compositions. The polymers effectively enhance the temperature dependent rheological behaviour of the PIB-based primary window sealant within certain desired temperature ranges.

The G' modulus of the PIB-based sealant compositions remains substantially unchanged at ambient temperature (25° C.) and also at elevated temperatures (130° C.). This behaviour is highly desirable as it enables the conventional assembly of the IG units using the PIB primary sealant at ambient temperature using the conventional production equipment and process conditions to achieve the required structural integrity of the IG unit. Additionally, it is highly desirable that the Theological behaviour of the product at the elevated temperatures encountered during extrusion, typically at temperature of approximately 120° C., remains largely unchanged due to the limitations of the extrusion equipment that is typically used in the production process of IG units.

When compared with currently available Theological enhancers for PIB sealants, the polymers of the present invention provide a number of benefits. Firstly, the increase in stiffness, as seen in the thermal viscoelastic behaviour of the PIB sealant, occurs principally within the required temperature range of 60-80° C. Secondly, the polymers of the present invention can be readily incorporated into the IGU or solar panel sealant formulation without significant reformulation being required or without changes to current manufacturing equipment and processes.

Furthermore, the polymers used in the sealant composition of the present invention can also be economically produced by a facile one-step solvent free process from readily available reactants and does not require any additional purification steps Due to the polymers high molecular weight, and therefore high viscosity, such reaction needs to be performed at elevated temperature, typically 100°-130° C. using appropriate mixing equipment.

Moreover, the polymers used in the sealant composition of the present invention can be readily synthesised within the PIB polymer base used in the final product or alternatively by reaction of the components in situ in the final product formulation The high temperatures and the mixing equipment typically used in the sealant manufacturing are ideal for facilitating the synthesis of the compound of the present invention without the need to pre-form it as a separate product.

The Backbone Q

The backbone Q is obtained by the copolymerisation of a mixture of monomers comprising at least an ethylenically-unsaturated aliphatic hydrocarbon monomer and at least one monomer containing a maleic anhydride moiety.

Preferably, the ethylenically-unsaturated aliphatic hydrocarbon monomer is selected from ethylene or propylene.

When referring to maleic anhydride units in the polymer backbone Q, it will be appreciated that we are referring to the units derived from the polymerisation of maleic anhydride monomers with␣␣␣␣at least one other ethylenically-unsaturated aliphatic hydrocarbon monomer (referred to as the first ethylenically-unsaturated monomer, and which is different to the maleic anhydride monomer). Thus, in the polymeric material, the "backbone" Q is formed by the polymerisation of maleic anhydride monomers together with monomeric units formed by the polymerisation of the at least a first ethylenically-unsaturated aliphatic hydrocarbon monomer. At least a portion of these maleic anhydride units present in Q are modified by a reaction with a side chain precursor as defined herein such that at least a proportion of the maleic anhydride units comprise pendant —Y—R side chains covalently attached thereto.

In an embodiment, Q is a straight chain polymer backbone which is a copolymer obtained from the polymerisation of at least one ethylenically-unsaturated aliphatic hydrocarbon monomer and at least one maleic anhydride monomer.

In a preferred embodiment, the polymeric backbone Q further comprises a unit obtained by the inclusion of a second or further ethylenically-unsaturated monomer species (which is different to the first ethylenically-unsaturated monomer species) in the copolymerisation reaction.

In a particular embodiment, the polymer backbone Q is a terpolymer formed by the polymerisation of a first ethylenically-unsaturated aliphatic hydrocarbon monomer species, a maleic anhydride monomer, and a second ethylenically-unsaturated monomer species.

A terpolymer is a copolymer formed from the polymerisation of three different monomer species. Therefore, the term "terpolymer" falls within the scope of the term "copolymer".

Typically, the second ethylenically-unsaturated monomer is a vinyl monomer, more preferably an acrylate monomer. For example preferred monomers are selected from the group consisting of (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate. More preferably, the second ethylenically-unsaturated monomer is an alkyl acrylate or methacrylate, for instance, methyl, ethyl, propyl or butyl acrylate or methacrylate.

In a different embodiment, the second ethylenically-unsaturated monomer is an alkenyl acetate, preferably a $C_{4-10}$ alkenyl acetate, preferably vinyl acetate.

In a preferred embodiment, the polymer backbone Q is a terpolymer formed by the polymerisation of monomers of ethylene, vinyl-acetate and maleic anhydride [i.e. it is a poly(ethylene-co-vinylacetate-co-maleic anhydride)]. The ethylene content in the terpolymer backbone helps to increase the chemical stability. The degree of hydrophobicity of the backbone may be varied by changing the proportion of maleic anhydride and vinyl acetate in the backbone.

In an embodiment, the terpolymer has the general formula C-D-E shown below (wherein C is ethylene, D is maleic anhydride and E is the second ethylenically unsaturated monomer (e.g. vinyl acetate)).

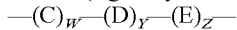
$$-(C)_W-(D)_Y-(E)_Z-$$

It will be appreciated that the terpolymer C-D-E may be a random copolymer or a block copolymer.

Typically, C is present in amount of 25-95% by weight of the C-D-E terpolymer. Preferably, C is present in amount of 50-95% by weight of the C-D-E terpolymer. Preferably, C is present in amount of 60-80% by weight of the C-D-E terpolymer. Preferably, C is present in amount of 65-80% by weight of the C-D-E terpolymer. In a particularly preferred embodiment, C is present in amount of 69-76% by weight of the C-D-E terpolymer (e g. 73 to 75.5 % by weight).

Typically, D is present in amount of 0.01-50% by weight of the C-D-E terpolymer. Preferably, D is present in amount of 0.02-25% by weight of the C-D-E terpolymer. Preferably, D is present in amount of 0.05-10% by weight of the C-D-E terpolymer. Preferably, D is present in amount of 0.075-5% by weight of the C-D-E terpolymer. In a particularly preferred embodiment, D is present in amount of 0.1-0.7% by weight of the C-D-E terpolymer (e.g. 0.1-0.2% by weight or 0.5 to 0.7% by weight).

Typically, E is present in amount of 4-70% by weight of the C-D-E terpolymer. Preferably, E is present in amount of 10-65% by weight of the C-D-E terpolymer. Preferably, E is present in amount of 10-60% by weight of the C-D-E terpolymer. Preferably, E is present in amount of 15-60% by weight of the C-D-E terpolymer. In a particularly preferred embodiment, E is present in amount of 23-53% by weight of the C-D-E terpolymer (e.g. 23.5-27% by weight).

In a preferred embodiment, C is present in amount of 25-95% by weight of the C-D-E terpolymer, D is present in amount of 0.01-50% by weight of the C-D-E terpolymer, and E is present in amount of 4-70% by weight of the C-D-E terpolymer.

In another preferred embodiment, C is present in amount of 30-90% by weight of the C-D-E terpolymer, D is present in amount of 0.01-25% by weight of the C-D-E terpolymer, and E is present in amount of 9-65% by weight of the C-D-E terpolymer.

In another preferred embodiment, C is present in amount of 60-80% by weight of the C-D-E terpolymer, D is present in amount of 0.01-10% by weight of the C-D-E terpolymer, and E is present in amount of 19-39% by weight of the C-D-E terpolymer.

In another preferred embodiment, C is present in amount of 65-80% by weight of the C-D-E terpolymer, D is present in amount of 0.01-5% by weight of the C-D-E terpolymer and E is present in amount of 15-30% by weight of the C-D-E terpolymer.

In a particular embodiment, C is present in amount of 69-77% by weight of the C-D-E terpolymer (e.g. 73 to 76.5% by weight), D is present in amount of 0.15-0.7% by weight of the C-D-E terpolymer (e.g. 0.1-0.2 % by weight or 0.5 to 0.7% by weight) and E is present in amount of 22-30% by weight of the C-D-E terpolymer (e.g. 23.5-27% by weight).

Typically, the ratio of w:y:z is 100-10000:1:15-500. In a preferred embodiment, the ratio of w:y:z is 100-5000:1:15-300. In another preferred embodiment, the ratio of w:y:z is 200-2500:1:15-250. In a further preferred embodiment, the ratio of w:y:z is 1600-1700:1:150-200 (e.g. 1603-1669:1:165-190). In another preferred embodiment, the ratio of w:y:z is 350-410:1:25-30.

Q preferably has a molecular weight in the range 10-500,000 Da, more preferably in the range 50-200,000 Da, more preferably in the range 500-100,000 Da, more preferably in the range 2000-50,000 Da.

The most preferred polymer backbones Q are ethylene-vinyl-acetate-maleic anhydride terpolymers Such preferred terpolymers are available commercially under the brand name Orevac T supplied by Arkema. A number of the Orevac materials (grades 9309, 9314, 9307 Y, 9318, 9304, 9305) are suitable ethylene-vinyl acetate-maleic anhydride terpolymers. Orevac 9304 and Orevac 9305 are especially preferred. The composition of Orevac 9304 and Orevac 9305 are shown below.

$(C_2H_4)_W(C_4H_2O_3)_Y(C_4H_6O_2)_Z$[(ethylene)$_W$(maleic anhydride)$_Y$(vinyl acetate)$_Z$]

| Orevac | Maleic anhydride mole ratio/% weight | Vinyl acetate Mole ratio/% weight | Ethylene mole ratio/% weight |
|---|---|---|---|
| 9304 | 1/0.16 | 165-190/23.5-26.6 | 1603-1669/73.3-76.3 |
| 9305 | 1/0.65 | 26-30/46-53.4 | 379-401/69.4-73.4 |

Side Chains

The backbone Q is grafted with at least one pendant —Y—R side chain. Each pendant —Y—R side chain is preferably covalently attached to the backbone Q by the reaction of a side chain precursor and a maleic anhydride moiety of the backbone. The side chain precursor will typically have the general formula:

H—Y—R wherein Y and R are each as defined herein.

When referring to the maleic anhydride monomeric component of the backbone Q, it will be noted that we are referring to the units derived from maleic anhydride which are present in the copolymer or terpolymer Q. In the polymeric material, the "backbone" comprises the units derived from maleic anhydride together with units derived from the other monomers polymerised to make the backbone of the polymeric material. The "side chains" comprise the residual structure of the side chain precursors, after they have reacted with the copolymer or terpolymer starting material(s).

Suitably, a multiplicity of hydrophilic side chains, —Y—R, are attached to the backbone. The number of side chains attached to the backbone Q is represented by x. Typically, x is 1 to 5000, and preferably x is 2 to 1000, 5 to 500 or 5 to 300, even more preferably x is 1 to 150, 2 to 100 or 3 to 50.

It will be appreciated that the number of —Y—R side chains present in certain embodiments will depend on the amount of side chain precursor reacted with the backbone copolymer precursor Q and the amount of maleic anhydride monomer units present. Typically, the amount of —Y—R side chain present will be within the range of 0.1-20% by weight of the total polymer of the present invention. More typically, the amount of —Y—R side chain present will be within the range of 0.5-5% by weight of the total polymer of the present invention.

Y is suitably —O—, or —NR$^1$—. In a preferred embodiment. Y is —O—.

When Y is —O—, R is preferably linked to a maleic anhydride monomer of Q by an ester bond. When Y is —NR$^1$—, R is preferably linked to a maleic anhydride monomer of Q by an amide bond.

As shown below, it is possible for one or two —Y—R side chains to graft on to a single maleic anhydride moiety in the backbone Q. Formula A below shows a maleic anhydride monomer which has reacted with one H—Y—R side chain precursor to form an ester when Y is O or an amide when Y is —NR$^1$—. Formula B below shows a maleic anhydride monomer which has reacted with two H—Y—R side chain precursor molecules. Lastly, grafts of formula C below can occur when Y is —NH—.

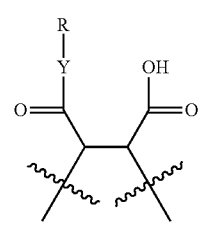

A

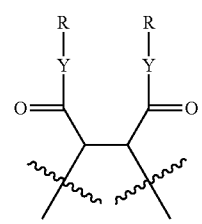

B

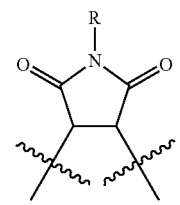

C

R$^1$ is preferably H, methyl or ethyl. In a preferred embodiment, R$^1$ is H or methyl. In a particularly preferred embodiment. R$^1$ is H.

Suitably, R is an amphiphilic polymer side chain comprising at least one discrete hydrophobic portion formed by hydrophobic monomer units and at least one hydrophilic portion formed by hydrophilic monomer units.

According to the present invention, the amphiphilic polymer side chain preferably has a hydrophilic-lipophilic balance (HLB) value in the range of 0-20, preferably 3-19, more preferably 7-11.

Preferably, R is an amphiphilic polymer side chain comprising between 20 and 95% by weight of hydrophilic monomers. More Preferably, R comprises between 50 and 95% by weight of hydrophilic monomers and, even more Preferably, between 65 and 90% by weight of hydrophilic monomers.

In a preferred embodiment, R is an amphiphilic block copolymer comprising one or more hydrophobic portions or blocks and one or more hydrophilic portions or blocks, each portion or block being formed from a plurality on monomer units.

In an embodiment, R is a di-block co-polymer of the general formula:

—A—B or

A—B— wherein A is a hydrophilic polymer block comprising two or more hydrophilic monomer units and B is a hydrophobic block comprising two or more hydrophobic monomer units.

It will be appreciated that the polymer may be linked to the polymer backbone Q via the group Y by either block A or B.

Typically, A will account for 20 to 95% by weight of the A-B polymer. Preferably, A will account for 50 to 90% by weight of the A-B polymer and, even more preferably, A will account for 65 to 90% by weight of the A-B polymer. In a particularly preferred embodiment, A accounts for about 80% by weight of the AB polymer and B accounts for about 20% by weight.

In a preferred embodiment, the each side chain —[Y—R] is a group of the formula —[Y—A—B] wherein Y, A and B each have any one of the definitions set out herein.

In a preferred embodiment, A is poly(ethylene oxide) and B is a polyalkylene. In a particular embodiment, A is —(CH$_2$CH$_2$O)$_h$— and B is —(CH$_2$CH$_2$)$_g$—. Typically, h is 5 to 1000 and g is 1 to 1000. More preferably, h is 20 to 100 and g is 2 to 100. In a preferred embodiment, h is 30 to 70 and g is 5 to 25.

In a particularly preferred embodiment, the group —Y—R has the formula:

—O—(CH$_2$CH$_2$O)$_h$-(CH$_2$CH$_2$)$_g$-T wherein h and g are as defined herein and T is a terminating group selected from H or C$_{1-4}$alkyl. Typically, T is methyl.

R will typically have a molecular weight within the range 500 to 10,000 Da. More preferably, R will have a molecular weight within the range 1000 to 5000 Da.

Particularly suitable side chains —Y—R are formed by the reaction of side chain precursors with ethoxylated primary alcohols, such as those sold by Baker Hughes under the brand name Unithox. These materials are best described as A-B block copolymers such as those defined above, wherein A is a block of polyethylene oxide and B is a block of polyethylene. Particular examples of suitable side chain precursors include Unithox 550, 420 and 480. Unithox 550 (molecular weight 1100 Da) is an ethoxylated alcohol containing about 50% by weight of ethylene homopolymer and about 50% by weight of poly(ethylene oxide). Unithox 420 (molecular weight 575 Da) is an ethoxylated alcohol containing about 80% by weight of ethylene homopolymer and about 20% by weight of poly(ethylene oxide) The most preferred side chain precursor contains contains an ethoxylated polyethylene alcohol of formula:

CH$_3$(CH$_2$CH$_2$)$_g$(OCH$_2$CH$_2$)$_h$OH

One such preferred polyethylene alcohol is available commercially as Unithox 480.

In Unithox 480, the ethoxylated alcohol contains about 20% by weight of ethylene homopolymer (15.9 moles) and about 80% by weight of poly(ethylene oxide) (41.4 moles). The molecular weight of Unithox 480 is about 2300 Da.

Unless otherwise specifically noted, the molecular weight values recited herein are weight-average molecular weights as determined by size-exclusion chromatography (SEC), based on correlation to narrow linear polystyrene standards. For example, a SEC-observed Mw value of 100,000 means that the measured polymer has the same hydrodynamic volume as the polystyrene of the molecular weight 100,000 under the conditions used for both calibration and characterization (DMF0.1% TFA) of all samples.

Sealants

PIB materials are characterised by high elongation but they are susceptible to atmospheric oxidation, attack by ozone as well as softening and flowing at elevated temperatures. These systems are usually available as hot applied sealants. Poly isobutylene as a homopolymer is permanently tacky. It also has the characteristics of being self-healing. Polyisobutylene is a glass-clear polymer with elastomeric properties although showing high cold flow. Due to these characteristics it makes an excellent matrix for primary window sealant and solar panels.

The sealants according to the present invention preferably contain a polymer according to formula (I) and polyisobutylene (PIB). PIBs used in the sealants of the present invention have a weight average molecular weight, Mw, of from 20,000 to 4,000,000 g/mol, preferably between 30,000 and 100,000 g/mol, more preferably 35,000 to 75,000 g/mol.

The sealant optionally further comprises conventional sealant components selected from the group consisting of carbon black, filler, plasticizer, desiccant, stabiliser, antioxidant, and mixtures thereof. These are preferably incorporated in conventional amounts.

The filler can be selected from the group consisting of chalks, silicates, silicon and oxides.

The anti-oxidants can be selected from the group consisting of sterically hindered phenols, thioethers, mercapto compounds, phosphorus esters, benzotriazoles. benzophenones, HALS and antiozonants.

It is within the scope of the invention to use the sealant of the present invention for fabricating insulating glass for windows, conservatories, structural and roof glazing, for glazing in land-bound vehicles, watercraft and aircraft, and for manufacturing solar modules, including thermoelectric solar modules.

Preferably, the amount of polymer (I) in the sealant compositions of the present invention is in the range of 1-50 wt %, preferably 5-25 wt %, preferably 8-12 wt %.

Preparation of the Polymers Used in the Present Invention

The polymeric material used in the sealants of the present invention can be prepared by any suitable technique known in the art. Particular processes for the preparation of these compounds are described further in the accompanying examples.

Typically, the polymers of formula I defined above are prepared by the reaction of a backbone precursor Q' that is a straight or branched chain polymer backbone which is a copolymer comprising of at least one ethylenically-unsaturated aliphatic hydrocarbon monomer and at least one maleic anhydride monomer with a side chain precursor of the formula H—Y—R, wherein Y and R as defined herein.

As discussed above, the side chain precursors react with the maleic anhydride monomers to form pendant side chain grafts corresponding to either formula A, B or C below.

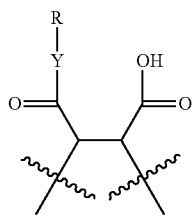

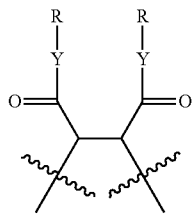

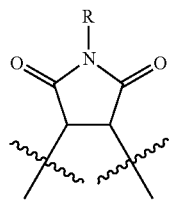

The "side chain precursors" are the side chain starting materials which become the grafted side chains in the polymeric material. Typically, the side chain precursors have terminal hydroxyl or amine groups, i.e. they are of the formula H—O—R or H—NR'—R, where $R^1$ is most typically H. The side chain precursors with terminal hydroxyl or amine groups will react with maleic anhydride monomers in the backbone precursor Q' to form ester or amide linkages respectively with the maleic anhydride groups within the copolymer. The opposing end of the side chain pre-cursor suitably comprises a terminal group T as defined herein before, e.g. a methyl group.

The "backbone precursor" is the copolymer of maleic anhydride with one or more other ethylenically-unsaturated co-monomers, which reacts with the side chain precursors and becomes the backbone in the polymeric material.

Typically, sufficient side chain precursor is added such that there is a molar ratio sufficient to graft two moles of side chains to each mole of maleic anhydride. More typically sufficient side chain precursors are reacted to ensure that 1-100% by weight of maleic anhydride units are derivitised with side chains, even more typically 2-50%, preferably 2-30%. However, in some embodiments of the invention, sufficient side chain precursors are added such that 100% of the maleic anhydride units in the backbone are derivitised. In another embodiment, sufficient side chain precursors may be added such that two or between one and two side chain precursors react with each maleic anhydride unit.

In an embodiment, the side chain precursor is terminated with a hydroxyl group, HO—R. The reaction of maleic anhydride with an alcohol is an alcoholysis reaction which results in the formation of an ester and a carboxylic acid. The reaction is also known as esterification. The reaction is relatively fast and requires no catalyst, although acid or base catalysts may be used. The net reaction may be represented as shown below. $P_X$ and $P_Y$ represent the remainder of the copolymer/terpolymer and ROH is a representative side chain precursor.

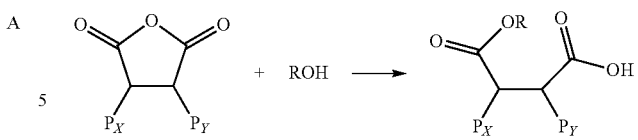

Two side chains precursors represented by ROH may react at the same maleic anhydride unit to give a compound of general formula

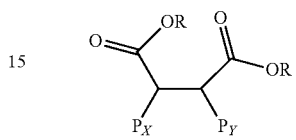

Alternatively, only one side chain precursor reacts per maleic anhydride monomer. This leaves the unit derived from maleic anhydride with a free carboxylic acid group, which may be derivatised at a later stage in the method. This group may also be deprotonated to give an ionic backbone in the polymeric material.

The most preferred side chain precursors are ethoxylated primary alcohols sold by Baker Hughes under the brand name Unithox, which are further defined above.

After reaction of the side chain precursors with the backbone precursor, any unreacted monomeric units derived from maleic anhydride remaining in the backbone Q may optionally be ring-opened. This may be performed by hydrolysis or by using a base. The resulting product may be ionisable. This further reaction step has particular utility when there is a large proportion of maleic anhydride in the backbone, for instance in an alternating copolymer.

The most preferred polymer backbones are ethylene-vinyl-acetate-maleic anhydride terpolymers available commercially under the brand name Orevac T supplied by Arkema. A number of the Orevac materials (grades 9309, 9314, 9307 Y, 9318, 9304, 9305) are suitable ethylene-vinyl acetate-maleic anhydride terpolymers. The reaction of an ethylene-vinyl-acetate-maleic anhydride terpolymer (e.g. Orevac 9304 or 9305) with an ethoxylated primary alcohol (e.g. Unithox 480, 550 or 420) is preferred. The polymer of formula I formed by the reaction of Orevac 9304 with Unithox 480 is particularly preferred.

In a preferred embodiment, the process is a solvent free melt process. This can be achieved in conventional heated mixing equipment, either by mixing together the backbone precursor Q' with the side chain precursor H—Y—R on their own, or by mixing the components within a PIB polymer sealant composition used. The latter approach enables the polymers of the present invention to be prepared in situ within the PIB primary sealant product.

The solvent free process eliminates the cost and hazards associated with organic solvents and avoids harmful solvent residues in the resultant amphiphilic polymeric material of the present invention. The synthesis of the amphiphilic polymeric material is achieved by efficient mixing of the intended side chain precursors with the backbone polymer precursor. Both the side chain and backbone precursors may be either a solid, in fluid form, a wax, a liquid or a gel, when they are added to the reaction mixture, provided that they can be mixed fairly efficiently. More preferably, they will be either a liquid or finely ground solid. Most preferably they will both be a liquid at the temperature at which the reaction takes place. Alternatively, the side chain precursors are liquid and the backbone precursors are a finely ground solid.

In one preferred embodiment of the invention, the backbone precursors are mixed with the side chain precursors by dissolving the backbone precursors in molten side chain precursors. Alternatively, side chain precursors may be dissolved in molten backbone precursors.

It will be appreciated by those skilled in the art that the reaction process may be performed using any piece of equipment that is capable of providing sufficient mixing. These may include reactors or any other vessels where agitation is provided by an overhead stirrer, a magnetic stirrer, most preferably mixing is achieved using an appropriate extruder, z-blade mixer, batch mixer, U trough mixer, RT mixer, compounder, internal mixer, Banbury type mixer, two roll mill, Brabender type mixer, a wide blade mixer (or hydrofoil blade mixer), horizontal (delta or helical) blade mixer, kneader-reactor, or a related variation of one of these mixers such as a double z-blade mixer or twin screw extruder.

The reaction mixture is typically stirred for between 30 minutes to 48 hours, more typically for 1 hour to 24 hours, most typically for between 2 hours to 6 hours, for instance, around 2 hours.

Increasing the temperature of the reaction mixture generally results in the side chain precursors melting, which allows efficient mixing, and in turn contributes to an increase in the rate of reaction. Therefore, the temperature of the reaction will preferably be between 50° C. and 300° C., more preferably between 100° C. and 250° C., even more preferably between 115° C. and 200° C., and most preferably between 110° C. and 130° C. Whilst too low a temperature might lead to the products being insufficiently mixed with poor grafting, too high a temperature will lead to undersirable side reactions.

Generally, the backbone and side chain precursors are heated to such temperatures after being mixed to form the reaction mixture. It is possible that the precursors may be pre-heated and then added to a reactor at a temperature suitable for the reaction.

Preferably the mixing apparatus is supplied with an inert gas to help prevent degradation of the polymeric materials. Alternatively the reactor may be placed under vacuum in order to ensure that air is excluded. The reaction can also be catalysed by addition of acid or base. Optionally water may be added to the reactor at the end of the reaction to hydrolyse any unreacted maleic anhydride groups. Furthermore so called polymerisation in-situ is equally easy and preferred. The polymeric material can be synthesised either within the poly isobutylene (PIB) composition or during the mixing process used to make the final formulation of the primary window sealant. Typically the backbone material and the side chain precursor material are mixed together and added to molten PIB.

Typically the reaction temperature is between 50° C. and 300° C., more preferably between 100° C. and 250° C., even more preferably between 115° C. and 200° C., and most preferably between 110° C. and 130° C., usually about 130° C. The reaction mixture of the backbone material, side chain precursor and the PIB or the sealant is mixed at the most preferred temperature for 1 hour to 24 hours, most typically for between 2 hours to 6 hours, for instance, around 2 hours. After this time the product is transferred to appropriate containers.

At the end of the reaction (which may also be referred to as the grafting reaction) any remaining anhydride groups may be converted into acid groups by the addition of water to the material, or by an aging process.

Preparation of the Sealants Used in the Present Invention

The sealants of the present invention are preferably produced according to two methods.

Method 1: The polymer of formula (I) is mixed with the polyisobutylene polymer and any optional sealant components (as defined herein).

Method 2: The backbone precursor and the side chain precursor of polymer of formula (I) are mixed with the polyisobutylene polymer and any optional sealant components, and the backbone precursor and the side chain precursor are reacted together to produce the polymer of formula (I) in situ (i.e., as part of the mixing process with the poly isobutylene polymer).

The mixing in either method can take place using any mixing method capable of preparing a homogeneous blend of polymer (I) with PIB and any optional sealant components where present.

A formulation of a typical primary window sealant is shown in the tables below:

| Raw material | Supplier | Parts by weight |
| --- | --- | --- |
| Vistanex LM-MH | Exxon Corp | 100 |
| Mistron vapour talc | Imerys Talc | 48 |
| Carbon black N990 | Cancarb Ltd | 2 |

From: Lowe, G. B. and Amstock, J. S. (1997) Sealants In: J. S. Amstock, ed., *Handbook of Glass in Construction*, 1$^{st}$ ed. New York: McGraw Hill, p 208.

| Raw material | Supplier | Parts by weight |
| --- | --- | --- |
| Oppanol B10 | BASF | 70 |
| Carbon black | Not specified | 30 |
| Oppanol B15 | BASF | 70 |
| Carbon black | Not specified | 30 |

From: BASF SE. *Oppanol PIB by BASF*. Available from https://www.dispersions-pigments.basf.com/portal/load/fid820883/Booklet_Oppanol PIB by BASF pdf

EXAMPLES

Synthesis of Preferred Polymer in Solvent 25 g Ethylene-vinyl-acetate—maleic anhydride terpolymer (ex Arkema Orevac T9304, 1600 ppm maleic anhydride) was added to a 250 ml flask and 25 g (29 ml) toluene was added.

The mixture was heated to reflux temperature (111° C.) and the stirrer was switched on when the mixture became mobile (~100° C.).

0.27 g of ethoxylated alcohol (ex. Baker Hughes Unithox 480 (MW. 2300)) was then added and the mixture was stirred at reflux for 3 hours and then removed from the heat and decanted into a glass jar. The solvent was then removed by application of vacuum at 60° C. over night before the polymer was used in the application.

Solvent Free Synthesis of Preferred Polymer in Twin Screw Extruder

Twin screw extruder Prism TSE 24 H.S.E was used with barrel length of 28:1. The polymer barrel had been purged with Ethylene-vinyl-acetate—maleic anhydride terpolymer (ex Arkema Orevac T9304) for 10 minutes at 130° C. before starting the reaction. The physical mixture of 6 kg of Ethylene-vinyl-acetate—maleic anhydride terpolymer (ex Arkema Orevac T9304) and 66 g ethoxylated alcohol (ex. Baker Hughes Unithox 480) was placed into the polymer feeder. The polymer feeding screw was set to 10 rpm which slowly fed the mixture into the extruder barrel The temperature profile from the feeder to the final die was as follows: 130° C., 140° C., 145° C., 140° C., and 135° C. The screw was set to run at 200 rpm creating a back pressure of 67%. The polymer was extruded from the die in the form a lace which passed through a tank of water to cool it before it passed through a cutter, which cut the lace into small pellets. The pellets were than captured into a container and the run was repeated again to ensure the reaction took place. The retention time in the extruder was 15 minutes during the first run and 25 minutes during the second run, making a total of 45 minutes of reaction time.

Synthesis of Preferred Polymer in-situ in Polyisobutylene in Brabender Type Mixer 46.4 g of polyisobutylene (ex BASF Oppanol B15) was added to the Brabender type mixer head and left for 5 minutes at speed of 18 rpm. After that time 9.18 g Ethylene-vinyl-acetate—maleic anhydride terpolymer (ex Arkema Orevac T9304) was added and left mixing for further 5 minutes. Followed by the addition of 0.1 g ethoxylated alcohol (ex. Baker Hughes Unithox 480). The speed of mixing was increased to 40 rpm and the mixture was left running for 2 hours at 128° C. After that time, the mixer was switched of and the mixture was left in the mixing head for further 40 minutes to ensure an increase in viscosity before transferring the mixture into a sample container.

Synthesis of Preferred Polymer in-situ in Primary Windows Sealant Using Z-Blade Mixer In order to produce a 670 g sample of sealant containing 20 wt % of the preferred polymer material, 536 g sealant and 135.47 g polymer need to be mixed together. The required 536 g sealant was weighed and transferred into a Z-blade mixer reactor preheated to 130° C. and mixing was initiated to allow the sealant to melt and for blending with the preferred polymer. After 15 minutes the required weight of ethylene-vinyl-acetate—maleic anhydride terpolymer (ex Arkema Orevac T9304) i.e. 134 g was added to the mixer and the sealant and terpolymer were homogenised by allowing them to stir for 1 hr. Then finally ethoxylated alcohol (ex. Baker Hughes Unithox 480); 1.47 g was added and allowed to react with the terpolymer for over an hour whilst the mixing and heating is maintained. After a approximate total of 2 hours of mixing was stopped and the product was discharge from the mixer (while hot) onto grease proof paper and allowed to cool. Once cooled to room temperature the product was then transferred to appropriate containers.

TABLE 1

Synthetic details of the compounds of the present invention

| Example No. | Backbone | Conc. MA (ppm) | Wt. backbone (g) | Mol. MA | Equivalents | Graft | M. wt. graft | Wt. graft (g) |
|---|---|---|---|---|---|---|---|---|
| 1 | Ethylene-vinyl-acetate - maleic anhydride terpolymer (Orevac 9304) | 1600 | 25 | 0.000408 | 0.29 | ethoxylated alcohol Unithox 480 | 2300 | 0.27 |
| 2 | Ethylene-vinyl-acetate - maleic anhydride terpolymer (Orevac 9304) | 1600 | 25 | 0.000408 | 1 | ethoxylated alcohol Unithox 480 | 2300 | 0.94 |
| 3 | Ethylene-vinyl-acetate - maleic anhydride terpolymer (Orevac 9304) | 1600 | 25 | 0.000408 | 0.29 | ethoxylated alcohol Unithox 420 | 575 | 0.07 |
| 4 | Ethylene-vinyl-acetate - maleic anhydride terpolymer (Orevac 9304) | 1600 | 25 | 0.000408 | 1 | ethoxylated alcohol Unithox 420 | 575 | 0.23 |
| 5 | Ethylene-vinyl-acetate - maleic anhydride terpolymer (Orevac 9304) | 1600 | 25 | 0.000408 | 0.29 | ethoxylated alcohol Unithox 550 | 1100 | 0.13 |
| 6 | Ethylene-vinyl-acetate - maleic anhydride terpolymer (Orevac 9304) | 1600 | 25 | 0.000408 | 1 | ethoxylated alcohol Unithox 550 | 1100 | 0.45 |
| 7 | Ethylene-vinyl-acetate - maleic anhydride terpolymer (Orevac 9304) | 1600 | 25 | 0.000408 | 0.29 | Jeffamine M2070 | 2000 | 0.24 |
| 8* | Ethylene-vinyl-acetate - maleic anhydride terpolymer (Orevac 9304) | 1600 | 25 | 0.000408 | 0.29 | MPEG 2000 | 2000 | 0.24 |
| 9* | Ethylene-vinyl-acetate - maleic anhydride terpolymer (Orevac 9304) | 1600 | 25 | 0.000408 | 0.29 | PEG 2000 | 2000 | 0.24 |
| 10 | Ethylene-vinyl-acetate - maleic anhydride terpolymer (Orevac 9305) | 6400 | 25 | 0.001633 | 0.29 | ethoxylated alcohol Unithox 480 | 2300 | 1.09 |
| 11 | Ethylene-vinyl-acetate - maleic anhydride terpolymer (Orevac 9305) | 6400 | 25 | 0.001633 | 1 | ethoxylated alcohol Unithox 480 | 2300 | 3.76 |
| 12 | Ethylene-vinyl-acetate - maleic anhydride terpolymer (Orevac 9305) | 6400 | 25 | 0.001633 | 0.29 | ethoxylated alcohol Unithox 420 | 575 | 0.27 |
| 13 | Ethylene-vinyl-acetate - maleic anhydride terpolymer (Orevac 9305) | 6400 | 25 | 0.001633 | 1 | ethoxylated alcohol Unithox 420 | 575 | 0.94 |
| 14 | Ethylene-vinyl-acetate - maleic anhydride terpolymer (Orevac 9305) | 6400 | 25 | 0.001633 | 0.29 | ethoxylated alcohol Unithox 550 | 1100 | 0.52 |

TABLE 1-continued

Synthetic details of the compounds of the present invention

| Example No. | Backbone | Conc. MA (ppm) | Wt. backbone (g) | Mol. MA | Equivalents | Graft | M. wt. graft | Wt. graft (g) |
|---|---|---|---|---|---|---|---|---|
| 15 | Ethylene-vinyl-acetate - maleic anhydride terpolymer (Orevac 9305) | 6400 | 25 | 0.001633 | 1 | ethoxylated alcohol Unithox 550 | 1100 | 1.80 |
| 16 | Ethylene-vinyl-acetate - maleic anhydride terpolymer (Orevac 9305) | 6400 | 25 | 0.001633 | 0.29 | Jeffamine M2070 | 2000 | 0.95 |
| 17* | Ethylene-vinyl-acetate - maleic anhydride terpolymer (Orevac 9305) | 6400 | 25 | 0.001633 | 0.29 | MPEG 2000 | 2000 | 0.95 |
| 18* | Ethylene-vinyl-acetate - maleic anhydride terpolymer (Orevac 9305) | 6400 | 25 | 0.001633 | 0.29 | PEG 2000 | 2000 | 0.95 |

*Examples 8, 9, 17 and 18 are comparators

Determination of the molecular weight of the preferred polymeric material using GPC All samples were prepared in toluene at a concentration of approximately 4 mg/ml. Prior to injection, samples were heated in toluene at 70° C. with constant stirring and left to cool back to room temperature.

Method parameters

GPC: Polymer Labs PL-GPC50

Flow Rate: 1 ml/min

Solvent: Toluene

Column: PL Gel 5 μm MIXED D 300×7.5 mm

Run time: 45 minutes

TABLE 2

Summary of GPC data for samples of preferred polymeric material synthesised in-situ in polyisobutylene.

| Example No | Backbone | Graft | Molecular weight determined by GPC |
|---|---|---|---|
| N/A | Ethylene-vinyl-acetate-maleic anhydride terpolymer (Orevac 9304) | N/A | 110,000-120,000 |
| 1 | Ethylene-vinyl-acetate-maleic anhydride terpolymer (Orevac 9304) | ethoxylated alcohol Unithox 480 | 110,000-120,000 |
| 4 | Ethylene-vinyl-acetate-maleic anhydride terpolymer (Orevac 9304) | ethoxylated alcohol Unithox 420 | 130,000-140,000 |
| 6 | Ethylene-vinyl-acetate-maleic anhydride terpolymer (Orevac 9304) | ethoxylated alcohol Unithox 550 | 120,000-130,000 |
| N/A | Ethylene-vinyl-acetate-maleic anhydride terpolymer (Orevac 9305) | N/A | 45,000-55,000 |
| 10 | Ethylene-vinyl-acetate-maleic anhydride terpolymer (Orevac 9305) | ethoxylated alcohol Unithox 480 | 65,000-70,000 |
| 13 | Ethylene-vinyl-acetate-maleic anhydride terpolymer (Orevac 9305) | ethoxylated alcohol Unithox 420 | 65,000-75,000 |
| 15 | Ethylene-vinyl-acetate-maleic anhydride terpolymer (Orevac 9305) | ethoxylated alcohol Unithox 550 | 65,000-75,000 |

Preparation of the Mixtures used in the Present Invention and Primary Window Sealant Mixing was carried out using a Brabender type mixer. Preferred polymer material was added to melted primary window sealant in the mixer. The heater was set to obtain a temperature of 130° C. inside the mixing head. The preferred polymer material can be added to the sealant at various levels—depending on the required rheological behaviour, however usually the addition level were 5%, 10%, 15% and 20% by the total weight of the mixture.

The mixing procedure was as follows: each run was carried using a 30 cc mixing head with roller blades. The mixing head was heated by an oil bath set to 160° C., resulting in a head temperature that was maintained at 151° C. ¾ of the sealant weight was introduced to the mixing head whilst the mixer was running at 18 rpm, followed by preferred polymer material and the remaining sealant. After 5 minutes the speed of mixing was increased to 30 rpm and the mixer run for 20 minutes. After that time the speed was increased again to 40 rpm and the mixer run for a further 10 minutes. The temperature of the blend inside the mixing head should remain at approx. 125° C. To remove the polymer blend, the mixing speed was reduced to 18 rpm, the oil bath was turned off and when temperature of the blend reaches 100° C. the mixing head is taken apart and emptied.
Further Examples of polymers of formula (I):
1. Details of Preparation of Super-PIB (JS980) Batches Batch 9812/14: 3150 g of Monarch 430 carbon black was dispersed in 10350 g of Oppanol B15 using a Zblade mixer for 60 minutes at 130° C. 1500 g of AGP1 (Example No 10 in Table 2) was added and mixed for 120 minutes at 130° C. Ingredients are the same as example 9803/17.

Batch 9803/17: 3150 g of Monarch 430 carbon black was dispersed in 10350 g of Oppanol B15 using a Zblade mixer for 60 minutes at 130° C. 1475 g of Orevac T9304 and 25 g of Unithox 480 were added simultaneously and mixed for 120 minutes at 130° C.

Oppanol B15 is polyisobutylene from BASF SE.
Monarch 430 is carbon black from Cabot Corporation.
Orevac T9304 is an ethylene-vinyl acetate-maleic anhydride terpolymer from Arkema Group.
Unithox 480 is an ethoxylated long-chain alcohol from Baker Hughes Inc.

2. Details of Preparation of JS880 batches

JS880 is a mixture of carbon black dispersed in polyisobutylene.

IG Unit Manufacture

Insulating glass units were prepared using modified PIB primary sealant according to the present invention.

The glass used was either 4 mm or 6 mm clear float glass, or 4 mm Glasstrôsch Silverstar EN2 Plus low-emissivity glass.

Spacer bars used were 12 mm aluminium (from Profilglass S.p.A), 16 mm Chromatech Ultra (a plastic and stainless steel composite spacer from Rolltech A/S) or 12 mm Thermix TXN+ (a plastic and stainless steel composite spacer from Ensinger GmbH). The desiccant used was Phonosorb 551 molecular sieve (type 3A zeolite from Grace Davison, a division of W. R. Grace & Co.)

All spacer frames were prepared by bending, with a PIB-coated plastic key making the final join. Each frame was filled on 2 sides with desiccant.

The modified PIB primary sealant was applied to the frames using a ram-fed extruder operating at 131° C. and 4-4.5 bar pressure.

Secondary sealants used were JS562 (2-component silicone, from tremco illbruck), JS442 (2-component polyurethane, from tremco illbruck), JS336 (1-component hot-melt butyl, from tremco illbruck) or JS900 (2-component hybrid polymer sealant, from tremco illbruck.)

20 IGUs were made with Thermix TNX+ spacer/modified PIB/JS 442/4 mm float glass/12 mm air space filled with Argon gas.

20 IGUs were made with Chromatech Ultra spacer/modified PIB/JS 442/4 mm float glass/16 mm air space filled with Argon gas.

30 IGUs were made with Profilglass aluminium spacer/modified PIB/JS 336/4 mm coated glass/12 mm air space filled with Argon gas.

20 IGUs were made with Profilglass aluminium spacer/modified PIB/JS 562/6 mm float glass/12 mm air space filled with Argon gas.

15 IGUs were made with Chromatech Ultra spacer/modified PIB/JS 562/6 mm float glass/16 mm air space filled with Argon gas.

During IG unit manufacture we found further surprising benefits of the graft copolymers used in the present invention.

1. The PIB sealant is preferably applied to the spacer bar using a simple ram-fed extruder and a pair of dies, one die coating each side of the spacer bar. With a conventional primary sealant, problems are caused by "run on;" when the extruder is stopped at the end of each spacer frame, material continues to be extruded for a short time. This leads to an excess of sealant at the final corner of the frame which needs to be cleaned up. With the copolymer additive this effect was eliminated.

2. The viscosity of the product during extrusion is highly temperature dependent, with small changes in the temperature at the die leading to a large change in viscosity. On typical primary sealant extruders, the temperature control is quite crude, leading to temperature fluctuations and consequent viscosity change leading to uneven sealant application during extrusion With the copolymer, this effect was greatly reduced and a better and more uniform coating achieved.

IG Unit Test Results

These are the IG units prepared using batch 9812/14 described above. The units tested were made with Thermix TX.N plus composite steel/polypropylene spacer bar (Ensinger GmbH) filled with Phonosorb 551 molecular sieve (Grace) and sealed with JS980 batch 9812/14 primary sealant and JS442 MF polyurethane secondary sealant (both tremco illbruck). The glass used was 4 mm clear float glass, and units were filled with Argon gas.

Testing was carried out according to EN1279-2 by ift Rosenheim.

The average moisture penetration index was 11% (pass criterion <=20%).

Testing of units with aluminium spacer. JS980 primary sealant and JS442 MF secondary sealant was carried out according to EN1279-3 by TUV Rheinland.

Argon gas loss rates were 0.51 and 0.61%/year (pass criterion <1.0%)

The JS980 was also tested as a 2 mm thick membrane for moisture vapour transmission rate (MVTR) and Argon permeability by TÜV Rheinland Nederland BV, both according to EN1279-4. The MVTR was 0.76±0.30 g/(m$^2$.24 h). The argon permeation rate=<0.024 g/(m$^2$.24 h).

Procedures for the Rheological Testing

Melt Viscosity Measurement

Melt viscosity is tested via rotational rheometry using TA Instruments rheometer AR2000ex. Test parameters are:
Temperature: 130° C.
Geometry: 25 mm stainless steel parallel plate
Gap: 2 mm
Low shear rate 1/s Frequency Sweep Measurement Frequency sweep is performed via oscillatory rheometry method using TA Instruments rheometer AR2000ex. Test parameters are
Frequency range: 0.05 Hz-50 Hz (0.31 rad/s-314 rad/s)
Temperature: 25° C.
Strain: 0.01
Geometry: 25 mm stainless steel parallel plate
Gap: 2 mm Temperature Dependent Rheological Behaviour (Temperature Sweep)

Temperature dependent behaviour was tested via temperature sweep procedure using TA Instruments rheometer AR2000ex. Test parameters were:
Frequency: 0.05 Hz (0.31 rad/s)
Strain: 0.1
Gap: 2 mm
Geometry: 25 mm stainless steel parallel plate Temperature range: 150° C. to minus 20° C. (going from high to low).

Melt Flow Index Measurement

This test method covers the determination of the rate of extrusion of molten sample using an extrusion MFI grader. After a specified preheating time, sample was extruded through a die with a specified length of 8.2 mm and orifice diameter of 9.5 mm under prescribed conditions of 130° C. and 2.16 kg load, and piston position in the barrel. The units of measure are grams of material/10 minutes (g/10 min). It is based on the measurement of the mass of material that extruded from the die over a given period of time. It is generally used for materials having melt flow rates that fall between 0.15 and 50 g/10 min.

Sample Compression for Rheological Measurements and Adhestion Testing

The majority of samples were pressed under controlled conditions to ensure the same thickness and the same level of stored energy within the samples. Moores electric press was used for sample compression. The top and bottom plate of the press set to 120° C. A stainless steel 3 mm thick template with 9 segments is used to ensure that the samples are comparable. Each segment is filled with 15 g of product. The template is placed between heated plates, left to warm for 3 minutes and pressed under pressure of 200 bar for approximately 2 minutes. Pressed samples are left to equilibrate to ambient temperature before testing.

TABLE 3

Summary of rheological properties for samples of primary window sealant (ex Tremco illbruck, JS880) after addition of the preferred polymer materials

| Sample Description | Melt viscosity (Pa · s) | MFI (unit) | Dynamic temperature sweep G' at 80° C., 0.05 Hz (kPa) |
|---|---|---|---|
| Physical mixture of the sealant and 10% wt/wt of material from Example 1 (lab scale) | 6935 | 0.8 | 33.72 |
| Physical mixture of the sealant and 20% wt/wt of material from Example 1 (lab scale) | 7288 | 0.82 | 33.07 |
| Physical mixture of the sealant and 10% wt/wt of material from Example 10 (lab scale) | 6512 | 0.9 | 21.03 |
| Physical mixture of the sealant and 20% wt/wt of material from Example 10 (lab scale) | 7036 | 1.5 | 12.45 |
| Physical mixture of the sealant and 10% wt/wt of material from Example 1 (industrial scale) | 4858 | 2.6 | 9.55 |
| Physical mixture of the sealant and 20% wt/wt of material from Example 10 (industrial scale) | N/A | 0.8 | 19.15 |

TABLE 4

Summary of rheological properties for samples of preferred polymeric material synthesised in-situ in primary window sealant (ex Tremco illbruck, JS880).

| Sample Description | Melt viscosity (Pa · s) | MFI (130° C., 2.16 kg) | Dynamic temperature sweep G' at 80° C., 0.05 Hz (kPa) |
|---|---|---|---|
| Primary window sealant (ex Tremco illbruck, JS880) | 8180 | 1.25 | 19.02 |
| Physical mixture of the sealant and 20% wt/wt of material from Example 1 (lab scale) | 7288 | 0.82 | 33.07 |
| Physical mixture of the sealant and 10% wt/wt of material from Example 1 (lab scale) | 6935 | 0.8 | 33.72 |
| Physical mixture of the sealant and 20% wt/wt of material from Example 10 (lab scale) | 7036 | 1.5 | 18.89 |
| 20% wt/wt of material from Example 1 synthesised in-situ in primary windows sealant. (50 g scale, Brabender mixer) | 8701 | 1.0 | 22.38 |
| 20% wt/wt of material from Example 1 synthesised in-situ in primary windows sealant. (500 g scale, Z-blade mixer) | N/A | 1.1 | 28.48 |
| 10% wt/wt of material from Example 1 synthesised in-situ in primary windows sealant. (15 kg scale, industrial trial) | 7685 | 1.2 | 41.83 |
| 20% wt/wt of material from Example 10 synthesised in-situ in primary windows sealant. (50 g scale, Brabender mixer) | 5755 | 1.5 | 20.7 |
| 20% wt/wt of material from Example 10 synthesised in-situ in primary windows sealant. (500 g scale, Z-blade mixer) | 5072 | 1.73 | 14.6 |

TABLE 5

Summary of rheological properties for samples of preferred polymeric material synthesised in-situ in polyisobutylene.

| Sample Description | Melt viscosity (Pa · s) | MFI (130° C., 2.16 kg) | Dynamic temperature sweep G' at 80° C., 0.05 Hz (kPa) |
|---|---|---|---|
| Polyisobutylene (ex BASF, Oppanol B15) | 4911 | 6.2 | 2.65 |
| Physical mixture of polyisobutylene and 20% wt/wt of material from Example 1 (lab scale) | 4686 | 4.9 | 1.05 |
| Physical mixture of polyisobutylene and 10% wt/wt of material from Example 1 (lab scale) | 4739 | 5.3 | 0.87 |
| Physical mixture of polyisobutylene and 20% wt/wt of material from Example 10 (lab scale) | 2789 | 8.0 | 0.65 |
| Physical mixture of polyisobutylene and 10% wt/wt of material from Example 10 (lab scale) | 2887 | 8.3 | 0.77 |

Figure 3:
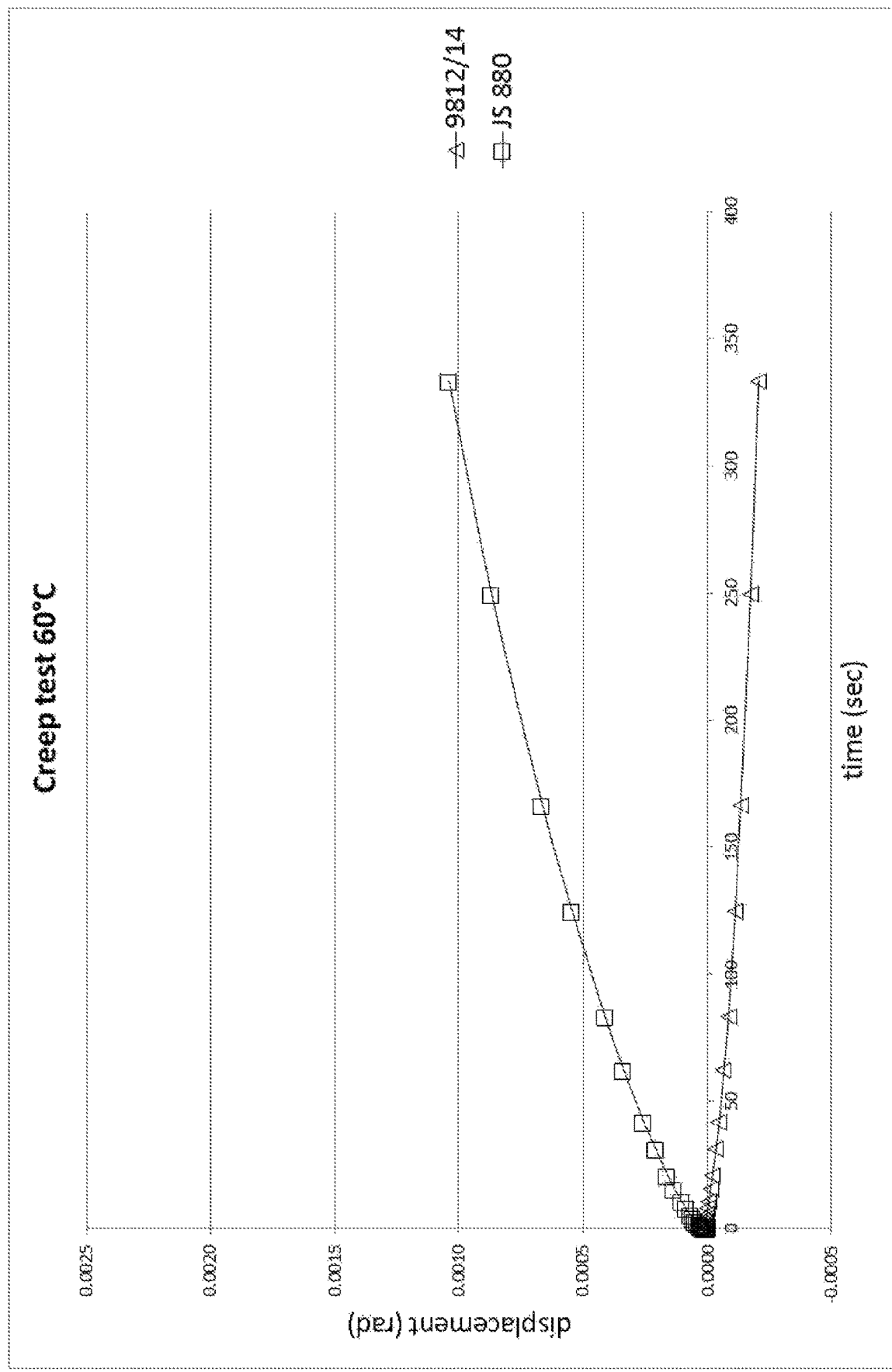
FIG. 3: Rheology Testing of sample 9812/14.

Some results are shown in FIG. 3. The graph shows that at 60° C. substantial creep (displacement) is seen when JS880 is subjected to a stress of 30 Pa. The 9812/14 formula, however, shows substantially no creep displacement. (The negative displacement is an artefact of the test method.)

Figure 4:
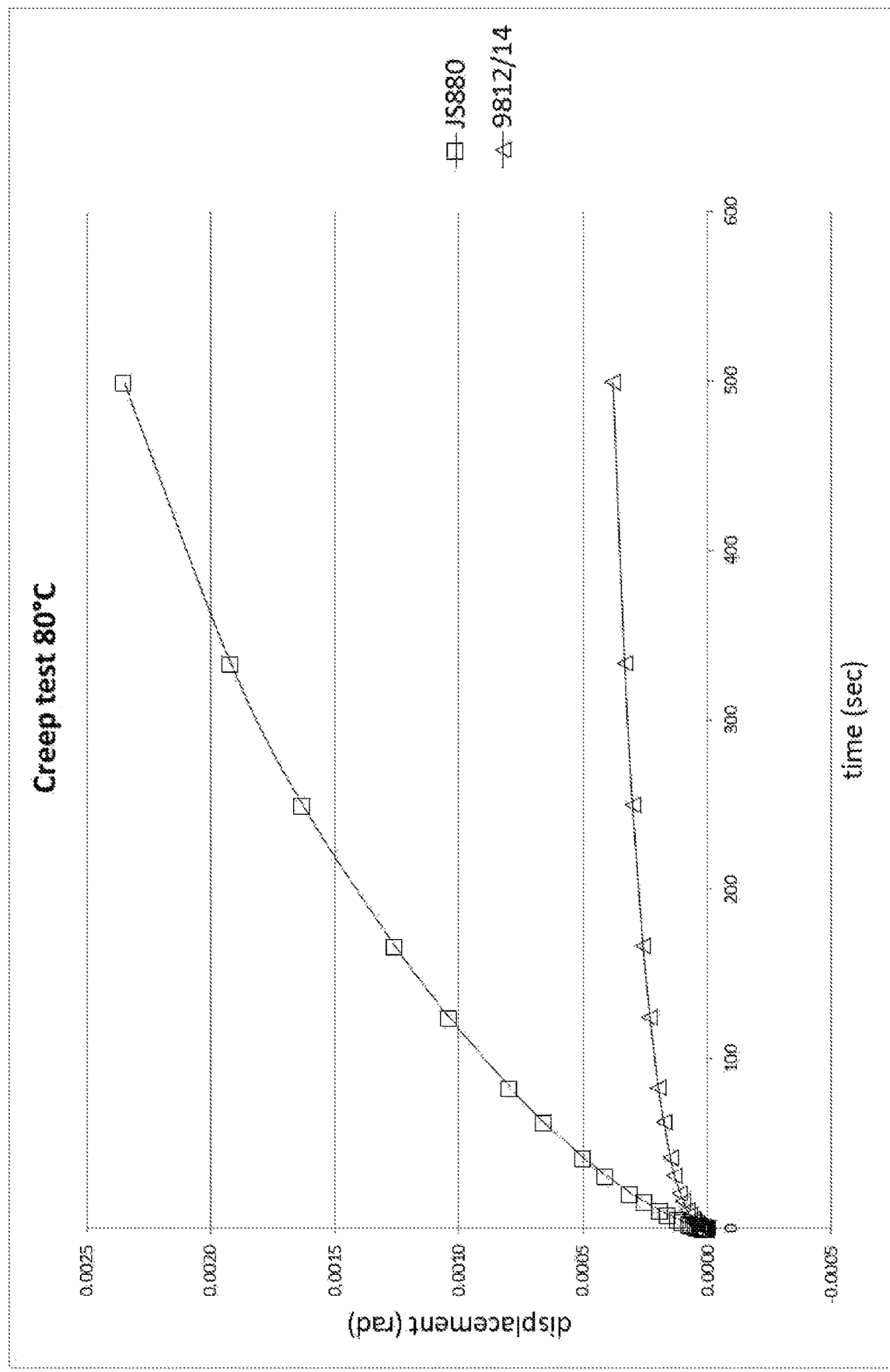
FIG. 4: Rheology Testing of sample 9812/14.

At 80° C. it can be clearly seen that 9812/14 shows significantly reduced creep compared with standard JS880. This indicates that the product would be much less likely to flow under stress at elevated temperatures The results are shown in FIG. 4.

Tables 3-4 show that sealants in accordance with the invention can achieve similar melt viscosity and increased modulus (G') at 80° C. compared with known sealants. Advantageously this means that the sealant according to the invention possesses acceptable extrusion rates at the normal application temperature and exhibits better mechanical stability at a service temperature of 80° C. Therefore sealants in accordance with the invention may be used to produce improved IG units with enhanced resistance to high temperatures.

The invention claimed is:

1. A sealant for insulating glass units (IGUs) or solar panels, comprising polyisobutylene (PM) and a polymer having the formula (I):

wherein:
Q represents a straight or branched chain polymer backbone which is a copolymer obtained from the polymerisation of at least one ethylenically-unsaturated aliphatic hydrocarbon monomer and at least one monomer containing a maleic anhydride moiety;
Y is selected from —O— or —NR'—, wherein $R^1$ is H or $C_{1-4}$ alkyl;
R is an amphiphilic polymer side chain; and
x is 1 to 5000.

2. A sealant according to claim 1, wherein the ethylenically-unsaturated aliphatic hydrocarbon monomer is selected from ethylene or propylene.

3. A sealant according to claim 1, wherein the monomer containing a maleic anhydride moiety is maleic anhydride.

4. A sealant according to claim 1, wherein the maleic anhydride moieties present in Q are modified by a reaction with a side chain precursor such that at least a proportion of the maleic anhydride units comprise pendant —Y—R side chains covalently attached thereto.

5. A sealant according to claim 1, wherein Q further comprises a unit obtained by the inclusion of a second or further ethylenically-unsaturated monomer species in the copolymerisation reaction.

6. A sealant according to claim 5, wherein the second ethylenically-unsaturated monomer is a vinyl monomer.

7. A sealant according to claim 5, wherein the second ethylenically-unsaturated monomer is an alkenyl acetate.

8. A sealant according to claim 7, wherein Q is a terpolymer formed by the polymerisation of monomers of ethylene, vinyl-acetate and maleic anhydride.

9. A sealant according to claim 5, wherein Q is a terpolymer which has the general formula C-D-E wherein C is ethylene, D is maleic anhydride and E is the second ethylenically unsaturated monomer, and C is present in amount of 25-95% by weight of the C-D-E terpolymer, D is present in amount of 0.01-50% by weight of the C-D-E terpolymer, and E is present in amount of 4-70% by weight of the C-D-E terpolymer.

10. A sealant according to claim 1, wherein Q is a terpolymer formed by the polymerisation of a first ethylenically-unsaturated aliphatic hydrocarbon monomer species, a maleic anhydride monomer, and a second ethylenically-unsaturated monomer species.

11. A sealant according to claim 1, wherein Q has a molecular weight in the range 10-500,000 Da.

12. A sealant according to claim 1, wherein x is 2 to 1000.

13. A sealant according to claim 1, wherein the amount of —Y—R side chain present will be within the range of 0.5-5% by weight of the polymer having the formula (I).

14. A sealant according to claim 1, wherein Y is —O—.

15. A sealant according to claim 1, wherein R is selected from the group consisting of a polyetheramine, a methoxy polyethylene glycol, a polyethylene glycol and an alcohol ethoxylate.

16. A sealant according to claim 1, wherein R is an amphiphilic polymer side chain comprising at least one discrete hydrophobic portion formed by hydrophobic monomer units and at least one hydrophilic portion formed by hydrophilic monomer units.

17. A sealant according to claim 1, wherein the amphiphilic polymer side chain preferably has a HLB value in the range of 0-20.

18. A sealant according to claim 1, wherein R is a di-block co-polymer of the general formula:
—A—B
or

A—B— wherein A is a hydrophilic polymer block comprising two or more hydrophilic monomer units and B is a hydrophobic block comprising two or more hydrophobic monomer units.

19. A sealant according to claim 18, wherein A will account for 20 to 95% by weight of the A-B polymer.

20. A sealant according to claim 18, wherein A is poly(ethylene oxide) and B is a polyalkylene.

21. A sealant according to claim 20, wherein A is —$(CH_2CH_2O)_h$— and B is —$(CH_2CH_2)_g$—, and wherein h is 5 to 1000 and g is 1 to 1000.

22. A sealant according to claim 21, wherein R is —$(CH_2CH_2O)_h$—$(CH_2CH_2)_g$—T, wherein h and g are as defined herein and T is a terminating group selected from H or $C_{1-4}$alkyl.

23. A sealant according to claim 1, wherein R has a molecular weight within the range 500 to 10,000 Da.

24. A sealant according to claim 1, wherein PIBs used in the sealants of the present invention have a weight average molecular weight, Mw, of from 20,000 to 4,000,000 g/mol.

25. A sealant according to claim 1, wherein the sealant optionally further comprises conventional sealant components selected from the group consisting of carbon black, filler, solvent, desiccant, stabiliser, anti-oxidant, adhesive and mixtures thereof.

26. A sealant according to claim 1, wherein the amount of polymer (I) in the sealant composition is in the range of 1-50 wt % by weight of the composition.

27. An insulating glass unit (IGU) comprising a sealant according to claim 1.

28. An insulating glass unit (IGU) according to claim 27, wherein the IGU further comprises glass panes, a glazing cavity filled with dry air or gas, a hollow spacer bar, a desiccant, and a secondary sealant.

29. A solar panel containing a sealant according to claim 1.

30. A process for producing an IGU, comprising applying a sealant according to claim 1 as a primary sealant.

31. A process for producing a solar panel, comprising applying a sealant according to claim 1 as a sealant.

32. A process for producing a sealant according to claim 1, comprising mixing the polymer having the formula (I) with a polyisobutylene polymer.

* * * * *